April 6, 1954 E. J. KIMM 2,674,268
DEVICE FOR CONTROLLING THE COMMUNICATION BETWEEN
A PRESSURE TANK AND THE ATMOSPHERE
Filed Oct. 29, 1949 2 Sheets-Sheet 2
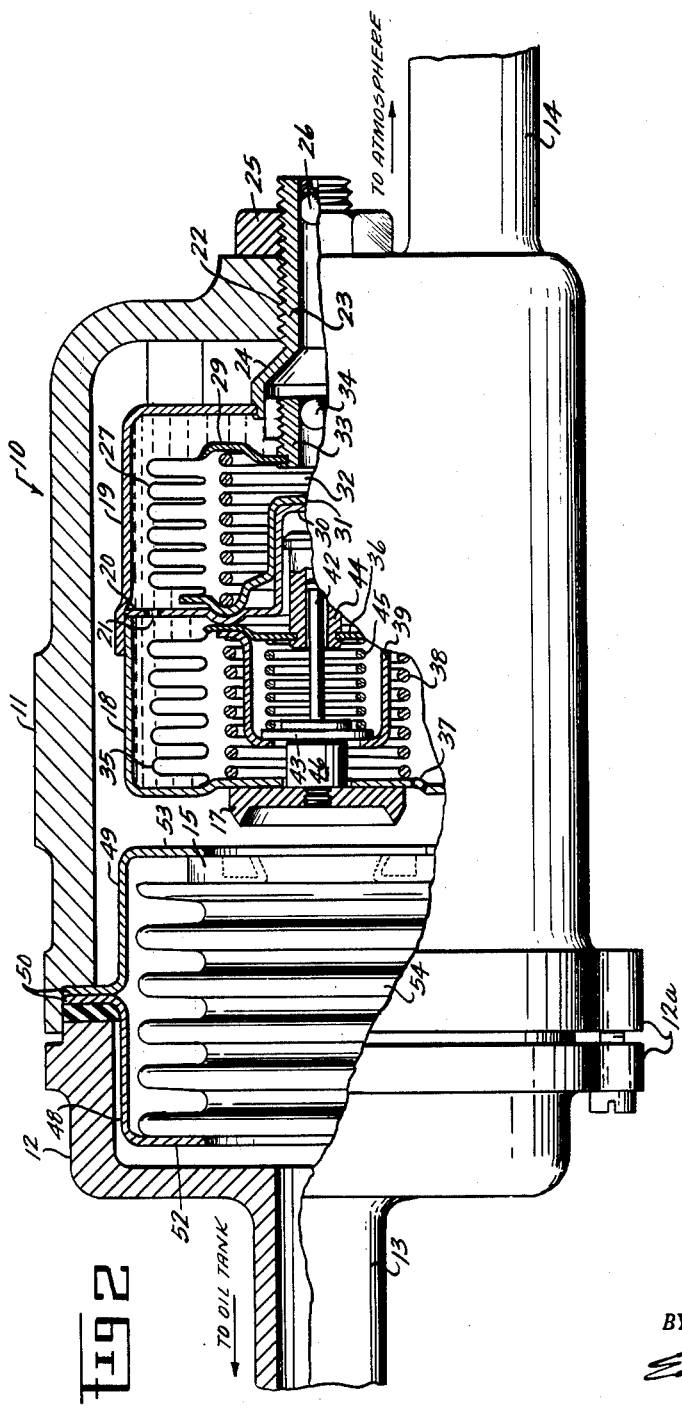
INVENTOR.
EWALD J. KIMM
BY
Edward Reed
ATTORNEY—

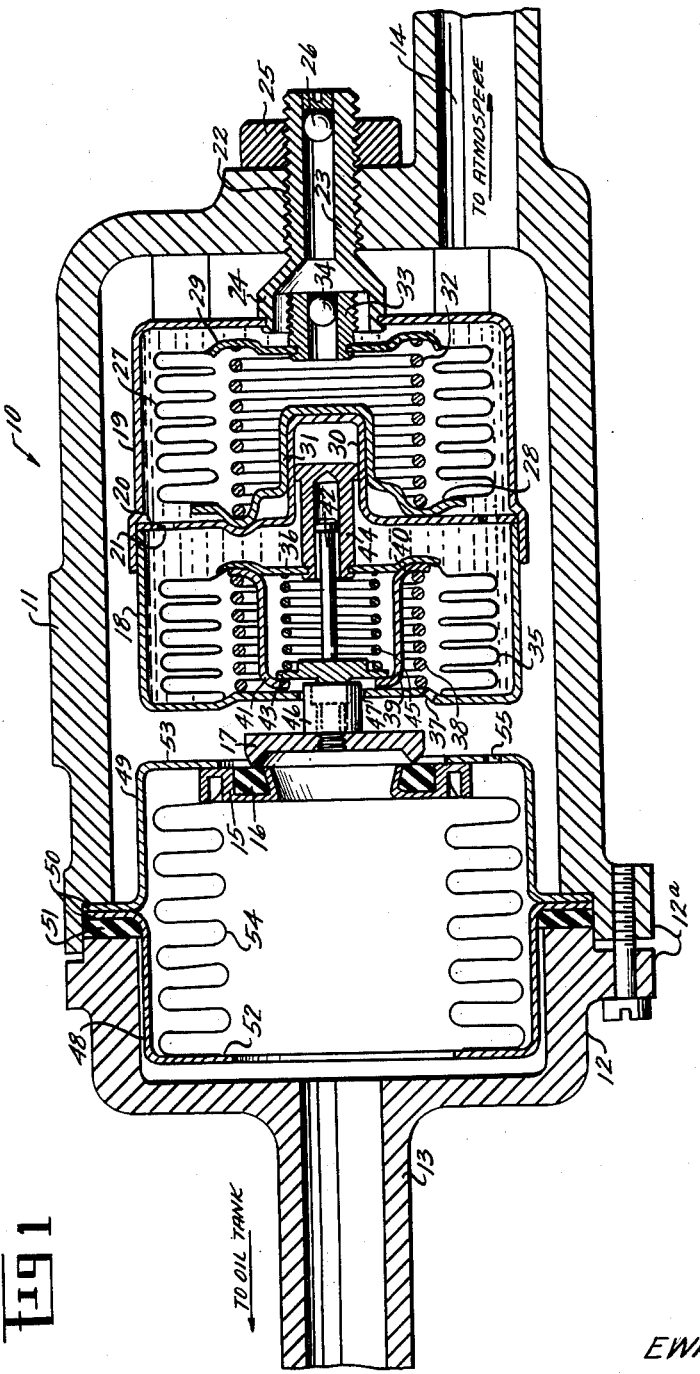

Patented Apr. 6, 1954

2,674,268

UNITED STATES PATENT OFFICE 2,674,268

DEVICE FOR CONTROLLING THE COMMUNICATION BETWEEN A PRESSURE TANK AND THE ATMOSPHERE

Ewald J. Kimm, Dayton, Ohio, assignor to Standard-Thompson Corporation, Dayton, Ohio, a corporation of Delaware Application October 29, 1949, Serial No. 124,289

16 Claims. (Cl. 137—785)

1

This invention relates to an apparatus for controlling the communication between a pressure tank and the atmosphere, and it is designed primarily for use with oil tanks on aircraft.

It is desirable that a substantial pressure shall be maintained in the oil tank of an aircraft at all altitudes. At comparatively low altitudes atmospheric pressure is sufficient for the purpose but at higher altitudes atmospheric pressure is insufficient and it is customary to interrupt the communication between the tank and the atmosphere and permit pressure to build up in the tank.

One object of this invention is to provide an improved apparatus for maintaining controlled pressure in an oil tank.

A further object of the invention is to provide an apparatus comprising two expansible devices, the expanding means for which are of such relative value that the expansion and contraction thereof may be controlled by variations in atmospheric pressure.

A further object of the invention is to provide such an apparatus which is "fail-safe," that is, an apparatus in which the valve will be opened, or will remain open, upon the failure of either expansible device.

A further object of the invention is to provide such an apparatus in which the valve mechanism includes a single valve seat.

A further object of the invention is to provide such an apparatus in which atmospheric pressure acts on an expansible device through the medium of a non-compressible fluid.

A further object of the invention is to provide such an apparatus which is simple in construction and efficient in operation.

A further object of the invention is to provide such an apparatus with means for preventing the collapse of the pressure tank due to an excessive drop of the pressure therein.

Other objects of the invention may appear as the apparatus is described in detail.

In the accompanying drawings, Figure 1 is a sectional view taken lengthwise of an apparatus embodying the invention and showing the valve in its closed position; and Figure 2 is a side view of said apparatus partly in section and partly in elevation, showing the valve in its open position.

In these drawings, I have illustrated one embodiment of the invention and have shown the same of a construction designed for use with the oil tank of an aircraft, but it is to be understood that the apparatus as a whole, as well as the several parts thereof, may take various forms and that the device may be used for various purposes without departing from the spirit of the invention.

The valve and its controlling mechanism may be supported on any suitable structure, and in the embodiment here illustrated the supporting structure comprises a housing 10 of elongate form divided into two parts, in the present instance a relatively long rear part 11 and a relatively short front part 12. The two parts may be connected one with the other in any suitable manner and as here shown, they are provided with a plurality of pairs of opposed lugs, the lugs of each pair being connected by a screw, one pair of said lugs being shown at 12ª.

The housing is provided with a passage through the same adapted to be connected with the oil tank and extending from the tank to the atmosphere. In the arrangement shown, this passage includes a tubular element 13 which communicates with the front end of the housing and is adapted to connect the latter with the oil tank, and a second tubular element 14 connected with the rear end of the housing and adapted to communicate with the atmosphere, the two elements being in open communication with the interior of the housing. However, the means for connecting the interior of the housing with the tank and with the atmosphere may be of any suitable character and may be arranged in any suitable relation one to the other. Within the housing is suitable valve mechanism adapted to be automatically actuated to open and close the passage through the housing. This valve mechanism may take various forms but preferably includes a single valve seat, and is shown as comprising an annular member 15 supported in the housing and having a part 16 constituting a valve seat, which is preferably formed of rubber or other suitable yieldable material. Cooperating with the valve seat is a valve member 17 which is supported and actuated in a manner to be hereinafter described.

Mounted within the housing is a structure comprising two compartments each of which contains an expansible element which divides the compartment into two parts. One part of each compartment contains a liquid and the liquid containing parts of the two compartments are so connected one with the other, that the expansion of the expansible element in either compartment will force liquid from that compartment into the other compartment and contract the expansible element in the latter. Thus each expansible element is alternately expanded and contracted, and valve actuating means is so connected with one of the expansible elements that the valve will be actuated by the expansion and contraction of that element. The expansion and contraction of one of said expansible elements is controlled by atmospheric pressure to such an extent that the valve will be opened at high atmospheric pressure and will be closed at relatively low atmospheric pressure.

In the illustrated arrangement the structure having said compartments comprises a casing of cylindrical form which includes a front portion 18 and a rear portion 19 rigidly connected one with the other, as by providing the adjacent ends thereof overlapping parts which may be brazed or otherwise secured one with the other. The interiors of the portions 18 and 19 of the casing are separated one from the other by a partition 20, thus dividing the casing into two compartments, and the partition is provided with one or more openings 21 to establish communication between the two compartments. The casing may be supported in the housing in any suitable manner. In the construction here illustrated the rear end of the housing is provided with a screw threaded opening 22 in which is mounted a screw threaded tubular supporting element 23, the inner end 24 of which is preferably flared and extends into an opening in the rear wall of the casing, with which it has sealed connection. The supporting member is adjustable with relation to the housing and is secured in an adjusted position by a nut 25. The tubular construction of the supporting member enables liquid to be introduced into the casing, and after the liquid has been introduced the tubular member is sealed, as shown at 26.

Mounted in the rear compartment 19 of the casing is an expansible device, such as bellows, 27, comprising an annular extensible element having sealed connection at its forward end with a front end member 28 which is mounted in a fixed position in the compartment, and having sealed connection at its rear end with a movable rear end member or plate 29. Preferably the front end member 28 is supported by the partition 20 and in the present construction that partition is provided with a rearwardly extending tubular portion 30, the rear end of which is closed, and the end plate 28 is provided with a rearwardly extending tubular portion 31 closed at its rear end and fitting snugly about the extension 30 of the partition. Thus the partition constitutes the sole support for the bellows and the expansion and contraction of the latter moves the rear member 29 from and toward the front end member. The bellows is provided with suitable means for expanding the same and this means preferably comprises a spring 32 confined between the front and rear end members of the bellows and tending constantly to expand the bellows. This rear bellows is preferably evacuated to render the same highly sensitive to external pressure. The rear member 29 of the bellows has mounted therein a tubular element or nipple 33 through which it may be evacuated and which may then be sealed as shown at 34, the nipple being in line with the tubular supporting member 23.

An expansible device is also mounted in the front compartment 18 and is here shown as a bellows comprising an annular extensible element 35 having sealed connection at its front end with the front wall of the casing and having sealed connection at its rear end with a movable rear end member, such as plate 36. This front bellows is sealed off from the front compartment but has open communication with the atmosphere, as by an opening 37 in the front wall of the casing. A spring 38 confined between the rear end member 36 and front wall of the casing tends constantly to expand the bellows and thus move the rear end member thereof rearwardly.

Mounted within the front bellows 35 is a valve actuating device which is connected with the rear member of that bellows for movement therewith. In the illustrated construction there is mounted within the spring 38, a tubular member 39 having at its rear end an outturned flange 40 which is in contact with the end member 36 of the bellows and with which the spring 38 contacts. This tubular member is also provided at its front end with an inturned flange 41. The valve actuating device is mounted within the tubular member 39 and is here shown as a rod 42 having adjacent its front end an abutment 43, the diameter of which is slightly greater than the diameter of the opening formed by the inturned flange 41. The rod 42 is movable lengthwise in the bellows and preferably the rear end thereof is slidably supported in a tubular member 44, the forward end of which is mounted in and has sealed connection with the rear end member 36 of the front bellows and the rear end of which is closed. A spring 45 confined between the rear member 36 of the bellows and the abutment 43 urges the actuating device forwardly and retains the abutment 43 normally in contact with the flange 41. The rod is rigidly connected with valve member 17, as by screwing the forward portion thereof into a portion 46 of the valve member which extends rearwardly from that member and in the present instance extends through an opening 47 in the front wall of the casing. Thus the expansion of this front bellows 35 retracts the valve 17 to valve opening position and the contraction of bellows 35 moves the valve member forwardly to the valve closing position. The spring 45 tends to press the valve actuating device forwardly with relation to the tubular member 39 and to hold the marginal portion of the abutment 43 in contact with the flange 41 of the tubular member, the flange 41 limiting the movement of the valve by the spring when the valve seat 16 is retracted as hereinafter explained.

The compartments 18 and 19 contain a noncompressible fluid, preferably a liquid, in such quantity as to substantially fill the spaces between the bellows and the walls of the compartments. Any suitable liquid may be used, but I have found silicone to be very satisfactory for the purpose because it does not become highly viscous at low temperatures and has a low vapor pressure at high temperatures. The springs which tend to expand the respective bellows are of such relative strengths that the pressure of the atmosphere in the front bellows controls the expansion and contraction of the bellows. In the present instance, the rear spring 32 is of a strength slightly greater than the strength of the spring 38 of the front bellows, the relation being such that at low altitude and relatively high atmospheric pressure, atmospheric pressure in the front bellows is added to the spring pressure and the total expanding force exerted on the front bellows is greater than the expanding force on the rear bellows. Consequently the front bellows is expanded and forces liquid from the front compartment into the rear compartment and thereby contracts the rear bellows against the action of its spring 32. This expansion of the front bellows moves the valve 17 to valve opening position, as shown in Figure 2. When the atmospheric pressure in the front bellows falls below a predetermined pressure, which it does at high altitudes, the total expanding force on the front bellows decreases to a value less than the value of the expanding force on the rear bellows, thereby permitting the rear bellows to expand and force liquid from the rear compartment into the front compartment and thus contract the front bellows and move the valve member 17 to valve closing position, as shown in Figure 1. This of course interrupts communication between the tank and the atmosphere and permits the pressure to build up within the tank so long as the valve remains closed. Should either bellows fail the spring 38 in the front bellows will open the valve and retain the same in its open position, thus preventing the building up of a dangerous pressure in the tank. It may be readily understood from observing Figure 1 that if a hole or an opening occurs in either bellows, some of the liquid will flow into that bellows. As this occurs, the volume of liquid within the defective bellows will not occupy space in either compartment between the bellows and the compartment wall. Therefore, expansion of one bellows may occur without the simultaneous contraction of the other bellows. So it may be seen that spring 38 can force the expansion of bellows 35 without the assistance of atmospheric pressure within the bellows 35.

If the body wall of bellows 35 fails, the liquid will flow into bellows 35. Due to the fact that a volume displacement therefore occurs, spring 38 will expand, thus moving the valve member 17 to valve opening position. If an opening or hole forms in bellows 27, liquid flows into the bellows 27. Volume displacement of the liquid occurs allowing space in the compartment to form so that spring 38 can force the expansion of bellows 35 without the assistance of atmospheric pressure. So it can be understood that upon failure of either bellows, spring 38 in the front bellows will open the valve and retain the valve in open position, thus preventing the building up of a dangerous pressure in the tank.

It may, also, be readily seen from observing Figure 1 that if the bellows 27 should fail to compress, the bellows 35 could not expand to rearwardly move the valve member 17 to valve opening position. However, when the internal pressure of the oil tank exceeds the pressure exerted by the spring 45, the internal oil tank pressure will cause the valve member 17 to move rearwardly opening the closure. If the bellows 35 should fail to expand to move the valve member 17 to valve opening position, the spring 45 will yield to high pressures within the oil tank and spring 38 will assist to relieve compression of spring 45, thereby allowing the valve member 17 to move to open the closure. If the bellows 35 should fail to compress, the valve member 17 will remain in valve open position. If either compartment wall should fail and allow a hole to exist in it, some of the fluid would flow out of the compartment. This would permit the spring 38 to expand, forcing expansion of the bellows 35, thus moving the valve member 17 which opens the valve.

If there is an excessive drop in the pressure in the tank, while the valve is closed, there is danger of the tank collapsing, and to avoid this possibility means are provided for automatically establishing communication between the tank and the atmosphere while the valve member 17 is in its closed position, so as to permit atmospheric air to enter the tank. For this purpose there is mounted in the front portion of the housing a second casing comprising front and rear cup-shape members 48 and 49 having at their open ends abutting flanges 50 which extend between the adjacent end portions of the two parts of the housing and are rigidly clamped between the same. A sealing element 51 is preferably interposed between one of the flanges and the adjacent part of the housing. The end walls of these cup-shape members are in the nature of flanges 52 and 53 and the openings formed by these flanges constitute parts of the passage through the housing. The opening formed by the rear flange 53 is of a diameter slightly less than the overall diameter of the annular member 15 so that the annular member contacts the flange, which limits the rearward movement thereof. The annular member 15 is held normally in contact with the flange 53 by a resilient member 54 which is here shown as a bellows-shaped resilient member connected at one end with flange 52 and at its other end with the annular member 15, the strength of this resilient member being such as to retain the annular member in contact with flange 53 so long as there is normal pressure in the tank. The annular member 15 extends inwardly beyond the edge of flange 53 such a distance that the valve member 17 engages the valve seat 16 a substantial distance from the edge of the flange, thus exposing a substantial portion of the annular member 15 to atmospheric pressure, and the cup-shape member 49 is provided with an aperture 55 which permits atmospheric pressure to act on the member 54 in a direction to retract the annular member 15. In the event tank pressure falls to a pressure substantially less than atmospheric pressure, atmospheric pressure acting on the annular member 15 and on the member 54 will move the annular member 15 out of contact with the flange 53 thus moving the valve seat out of engagement with the valve member, while the latter remains in its normal valve closing position, and permitting atmospheric air to enter the tank.

While I have shown and described one embodiment of my invention, I wish it to be understood that I do not desire to be limited to the details thereof as various modifications may occur to a person skilled in the art.

Having now fully described my invention, what I claim as new and desire to secure by Letters Patent, is:

1. In a valve controlling device of the character described, a casing comprising two compartments communicating one with the other, a sealed bellows in one of said compartments, a bellows in the other of said compartments having communication with the atmosphere, each of said bellows having a fixed end and a movable end, liquid substantially filling the space between the movable end of each of said bellows and a wall of its compartment, a spring in each of said bellows tending to expand the same and force liquid into the compartment of the other bellows, said springs being of such relative values that the expansion and retraction of said bellows is controlled by the atmospheric pressure in the bellows which is in communication with the atmosphere, and a valve actuating device operatively connected with one of said bellows.

2. In a valve controlling apparatus, a structure comprising two compartments communicating one with the other, liquid in said compartments, expansible devices immersed in the liquid in the respective compartments, each device including means for expanding the same and forcing liquid from one of said compartments to the other of said compartments, one of said expansible devices being in communication with the atmosphere, and the expanding means for one of said devices being of such value with relation to the expanding means for the other of said devices that at high atmospheric pressure the expanding force plus atmospheric pressure on said one of said devices will exceed the expanding force on said other device, and at relatively low atmospheric pressures the expanding force plus atmospheric pressure on the first mentioned device will be less than the expanding force on said other device, and a valve actuating device operatively connected with one of said expansible devices.

3. In a valve controlling device of the character described, a casing comprising two compartments communicating one with the other, a sealed bellows in one of said compartments, a bellows in the other of said compartment having communication with the atmosphere, liquid substantially filling the spaces between said bellows and the walls of said compartments, a spring in each bellows tending to expand the same and force liquid into the compartment of the other bellows, said springs being of such relative values that the expansion and contraction of said bellows is controlled by the atmospheric pressure in the bellows which is in communication with the atmosphere, and a valve actuating device operatively connected with one of said bellows.

4. An apparatus for controlling communication between a pressure tank and the atmosphere, comprising a structure including two compartments having communication one with the other, expansible devices in the respective compartments, liquid substantially filling said compartments exteriorly of said expansible devices, spring means tending to expand the respective expansible devices, one of said devices being sealed and the other of said devices being in communication with the atmosphere, the spring means for the last mentioned device being of much strength with relation to the strength of the spring means for said sealed device that at high atmospheric pressure said last mentioned device will be expanded to force liquid from its compartment into the compartment of said sealed device and contract said sealed device, and at relatively low atmospheric pressures said sealed device will be expanded by its spring means to force the liquid into compartment of said last mentioned device and contract the latter.

5. An apparatus for controlling communication between a pressure tank and the atmosphere, comprising a structure including two compartments having communication one with the other, liquid in said compartments, expansible devices immersed in the liquid in the respective compartments, each device including a movable member and an annular extensible member having sealed connection with said movable member and with a fixed part of said structure, spring means tending to expand the respective devices and to force liquid from the compartment of the device which is being expanded into the compartment of the other device, and the interior of one of said devices being in communication with the atmosphere, whereby the expanding force on said one of said devices will vary with the variations of the atmospheric pressure.

6. A device of the character described, comprising a housing having a passage adapted to be connected with a pressure tank and with the atmosphere, a casing in said housing having two compartments separated one from the other by a partition having an opening connecting said compartments, liquid in said compartments, an evacuated bellows immersed in the liquid in one of said compartments, a bellows immersed in the liquid in the other of said compartments and having communication with the atmosphere to receive atmospheric pressure to aid in expanding said bellows, separate spring means tending to expand the respective bellows, the expanding forces of the spring means on said bellows being of such relative values that at high atmospheric pressure the last mentioned bellows expands and forces liquid from its compartment into the compartment for the first mentioned bellows to contract the latter, and at relatively low atmospheric pressure said first mentioned bellows expands and forces liquid from its compartment into the compartment of the last mentioned bellows to contract the latter, and actuating means operable by one of said bellows.

7. In a valve controlling device of the character described, a casing comprising two compartments communicating one with the other, a sealed bellows in one of said compartments, a bellows in the other of said compartments having communication with the atmosphere, each of said bellows having a fixed and a movable end, liquid substantially filling the space between the movable end of each bellows and a wall of its compartment, a spring in each bellows tending to expand the same and force liquid into the compartment of the other bellows, said springs being of such relative values that the expansion and contraction of said bellows is controlled by the atmospheric pressure in the bellows which is in communication with the atmosphere, a valve actuating device operatively connected with one of said bellows and a second spring in the said last mentioned bellows urging said actuating device in one direction.

8. In a valve controlling device of the character described, a casing comprising two compartments communicating one with the other, a sealed bellows in one of said compartments, a bellows in the other of said compartments having communication with the atmosphere, liquid substantially filling the spaces between said bellows and the walls of said compartments, a spring in each bellows tending to expand the same and force liquid into the compartment of the other said bellows, said springs being of such relative values that the expansion and contraction of said bellows is controlled by the atmospheric pressure in the bellows which is in communication with the atmosphere, the last mentioned bellows having a rigid end member movable by the expansion and contraction thereof, a tubular member connected with said rigid member and extending into said bellows, a valve actuating element movably supported in said tubular member and adapted to be connected with a valve supported exteriorly of said casing, and a spring confined between said rigid end member and a part of said actuating element.

9. In a valve controlling device of the character described, a casing comprising two compartments communicating one with the other, a sealed bellows in one of said compartments, a bellows in the other of said compartments having communication with the atmosphere, liquid substantially filling the spaces between said bellows and the walls of said compartments, a spring in each bellows tending to expand the same and force liquid into the compartment of the other said bellows, said springs being of such relative values that the expansion and contraction of said bellows is controlled by the atmospheric pressure in the bellows which is in communication with the atmosphere, the last mentioned bellows having a rigid end member movable by the expansion and contraction thereof and provided with a tubular extension, a tubular member connected with said rigid member and extending into said bellows, a valve actuating rod slidable in said tubular extension and having a part in said tubular member forming an abutment, and a spring confined between said abutment and said rigid member.

10. In a device of the character described, a housing having a passage, said housing having in one end wall thereof an opening, a supporting member mounted in said opening, a casing rigidly secured to and supported by said supporting member, said casing having two compartments separated by a partition having an opening therethrough, two bellows mounted in the respective compartments, liquid substantially filling the spaces between said bellows and the walls of said compartments, springs tending to expand respective bellows and force liquid from one compartment into the other compartment, the bellows in one of said compartments being sealed and the bellows in the other of said compartments being in communication with the atmosphere, the spring in the last mentioned bellows having a strength slightly less than the strength of the spring in said sealed bellows, whereby the expansion and contraction of said bellows are controlled by atmospheric pressure in said last mentioned bellows.

11. In a device of the character described, a housing having a fluid passage, said housing having in one end wall thereof an opening, a casing in said housing having an opening in line with said opening in said housing, a tubular supporting member rigidly secured to said casing about the opening therein, adjustably mounted in said opening in said housing and sealed at its outer end, said casing comprising two compartments separated by a partition having an opening therethrough and having a tubular portion projecting into the compartment having said opening, an evacuated bellows in said compartment having one end wall mounted on said tubular portion of said partition, the other end wall of said bellows having a sealed opening substantially in line with the opening in said housing, a second bellows mounted in the other of said compartments and having communication with the atmosphere, springs in said bellows tending to expand the same, the spring in said evacuated bellows being of greater strength than the spring in the said second bellows, liquid substantially filling the spaces between said bellows and the walls of said compartments, one end wall of said second bellows having a tubular extension slidably supported in said tubular portion of said partition, an actuating element slidably supported in said second bellows, extending through said second bellows and a spring urging said actuating element in one direction.

12. In an apparatus for controlling communication between a pressure tank and the atmosphere, a housing having a passage therethrough a valve to control the flow of fluid through said passage including a valve seat and a valve member movable into and out of an engagement with said valve seat, means for controlling the movements of said valve member including a structure having two compartments communicating one with the other, expansible devices in the respective compartments, one of said devices being in communication with the atmosphere to receive atmospheric pressure to aid in expanding said expansible device, liquid substantially filling the spaces between said devices and the walls of said compartments, separate spring means for expanding said devices and forcing liquid from one compartment into the other, the relative values of said spring means being such that atmospheric pressure in said one of said devices controls the expansion and contraction of said devices, means operatively connecting one of said devices with said valve member, said valve member being of a diameter less than the outer diameter of said valve seat, whereby a portion of said valve seat is exposed to atmospheric pressure, and means to resist the movement of said valve seat by atmospheric pressure.

13. In a valve controlling apparatus, a structure comprising two compartments, an expansible device in each compartment, liquid in each compartment between a movable part of the expansible device in said compartment and a fixed part of said compartment, said structure having a passage through which said liquid may flow from one compartment to the other, each expansible device including resilient means for expanding the same and forcing liquid from the compartment containing said device into the other compartment to contract the expansible device in the latter, one of said expansible devices being in communication with the atmosphere to receive atmospheric pressure to aid in expanding said expansible device, a valve actuating device connected with the expansible device which is in communication with the atmosphere for movement in one direction by the expansion thereof, and the spring expanding means for said expansible device which is in communication with the atmosphere being of such value with relation to the expanding means for the other of said expansible devices, that variations in atmospheric pressure will cause said expansible device which is in communication with the atmosphere to be alternately expanded and contracted and to move said valve actuating device in one direction upon the failure of either of said expansible devices.

14. In a valve controlling device of the character described, a casing comprising two compartments communicating one with the other, a sealed bellows in one of said compartments, a bellows in the other of said compartments having communication with the atmosphere, each of said bellows having a fixed end and a movable end, liquid substantially filling the space between the movable end of each of said bellows and a wall of its compartment, a spring in each of said bellows tending to expand the same and force liquid into the compartment of the other bellows, said springs being of such relative values that the expansion and retraction of said bellows is controlled by the atmospheric pressure in the bellows which is in communication with the atmosphere.

15. In a valve controlling apparatus, a structure comprising two compartments, a bellows in each compartment, resilient operating means for each bellows, liquid in each compartment, said structure having a passage through which said liquid may flow from one compartment to the other, each bellows being expandable to force a portion of the liquid from one compartment to the other, one of said bellows being in communication with the atmosphere so that the atmospheric pressure can aid in expanding the last said bellows, and a valve actuating device operatively connected with one of said bellows.

16. In a valve controlling apparatus, a structure comprising two compartments, a bellows in each compartment, resilient operating means for each bellows, liquid in each compartment, said structure having a passage through which said liquid may flow from one compartment to the other, each bellows being expandable to force a portion of the liquid from one compartment to the other, one of said bellows being in communication with the atmosphere so that atmospheric pressure can aid in expanding the last said bellows, the resilient operating means for one of said bellows being of such value with relation to the resilient operating means of the other of said bellows that higher atmospheric pressures plus the force of the resilient operating means of said one of the bellows will exceed the force of the resilient operating means of said other bellows, and a valve actuating device operatively connected with one of the bellows, said valve actuating device being operable in one direction by expansion of the last said bellows, the resilient operating means for the last said bellows being of such value that at low atmospheric pressures said resilient operating means can expand said bellows upon failure of either bellows.

References Cited in the file of this patent
UNITED STATES PATENTS

| Number | Name | Date |
|---|---|---|
| 2,345,547 | Roth | May 28, 1944 |
| 2,400,048 | Jones | May 7, 1946 |
| 2,437,187 | Eshbaugh | Mar. 2, 1948 |
| 2,475,894 | Hermanny | July 12, 1949 |
| 2,571,667 | Bondurant | Oct. 16, 1951 |